United States Patent [19]
Jefferson

[11] Patent Number: 5,884,684
[45] Date of Patent: Mar. 23, 1999

[54] TELESCOPIC SUN SCREEN ASSEMBLY

[76] Inventor: Samuel Alexander Jefferson, 200 26th St., Apt. D-205, Atlanta, Ga. 30309

[21] Appl. No.: 116,148

[22] Filed: Jul. 16, 1998

[51] Int. Cl.[6] .......................................................... B60J 1/20
[52] U.S. Cl. ...................................... 160/370.21; 160/222
[58] Field of Search ........................ 160/370.21, DIG. 2, 160/DIG. 3, 211, 214, 216, 219, 222; 296/97.2, 97.6, 97.7, 97.8, 97.9, 97.11, 97.12

[56] References Cited

U.S. PATENT DOCUMENTS

| | | | |
|---|---|---|---|
| 4,728,142 | 3/1988 | Gavagan | 160/DIG. 3 X |
| 4,929,014 | 5/1990 | Clark et al. | 160/370.21 |
| 5,112,096 | 5/1992 | Keenan | 296/97.6 |
| 5,649,584 | 7/1997 | Leubecker | 160/370.23 |
| 5,749,618 | 5/1998 | Jones | 296/97.8 |

Primary Examiner—David M. Purol
Attorney, Agent, or Firm—Bernstein & Associates, P.C.

[57] ABSTRACT

A telescopic sun screen assembly for removably mounting to the interior of an automobile, such as the sun visor thereof. The assembly includes three telescopically arranged members, where a first member comprises a bracket for slidably receiving a second panel member, which in turn slidably receives the third panel member. The second panel member includes an opaque face, while the third panel member includes two different and distinct areas of translucency such that the user thereof may, by sliding the members relative to one another, determine the degree of sun protection desired.

7 Claims, 3 Drawing Sheets

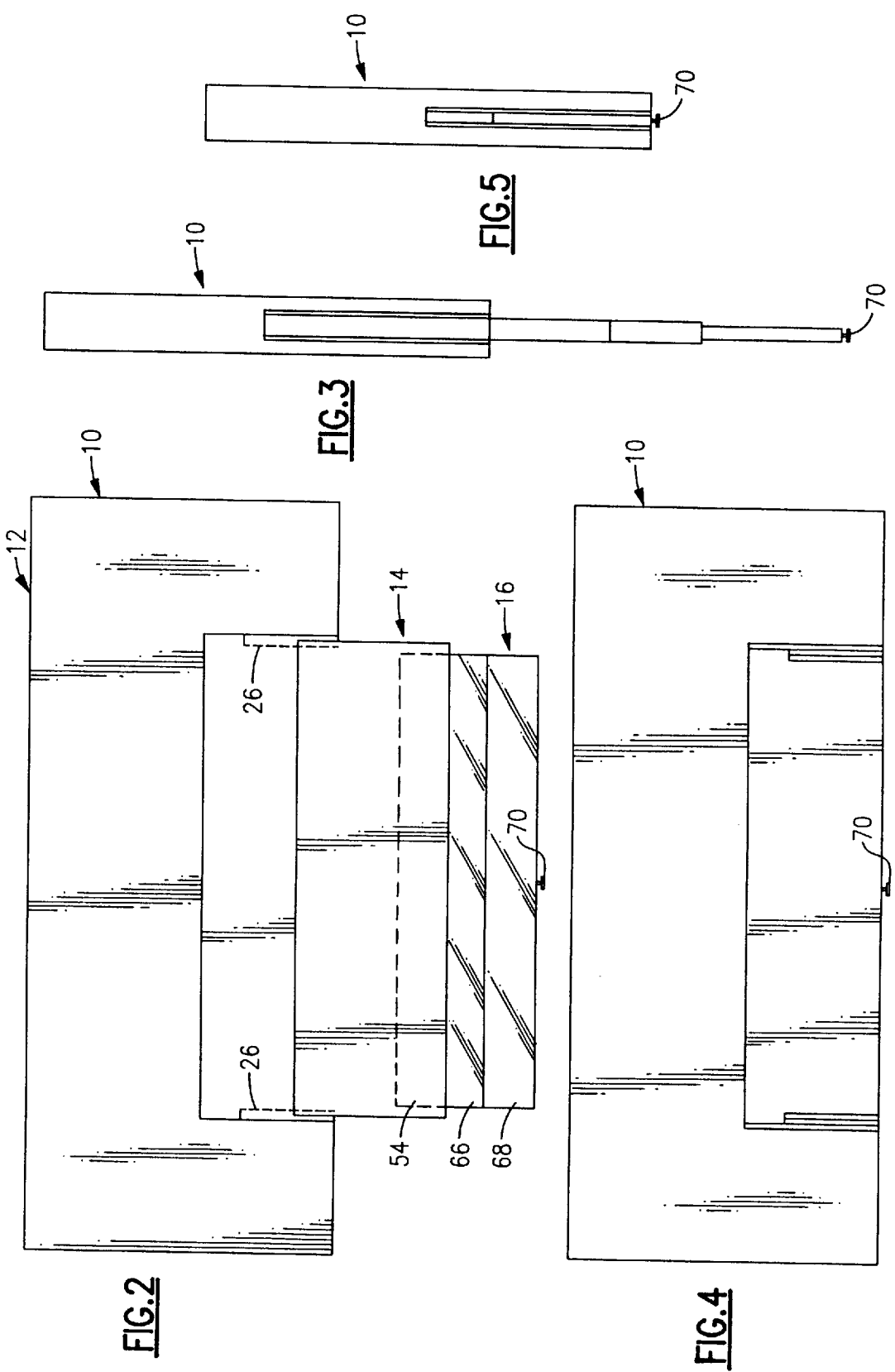

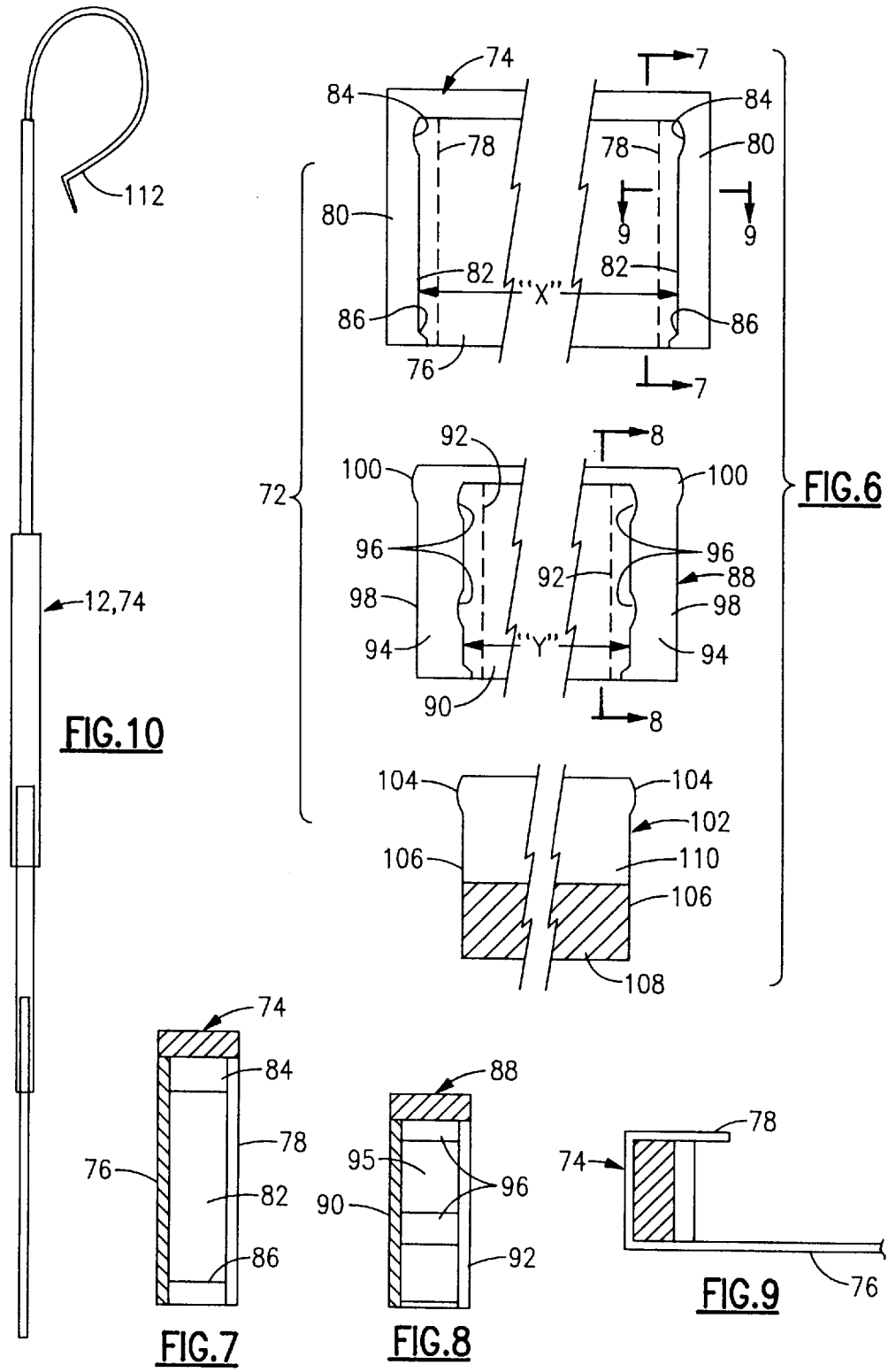

TELESCOPIC SUN SCREEN ASSEMBLY

CROSS-REFERENCE TO RELATED APPLICATIONS

The content of Disclosure Document No. 430,443 filed Jan. 28, 1998 is hereby incorporated by reference into the present application.

FIELD OF THE INVENTION

The present invention is directed to the field of portable, detachable sun screens that are particularly adapted for attachment to the interior of an automobile, such as a conventional automotive sun visor.

BACKGROUND OF THE INVENTION

The present invention relates to a user friendly sun screen assembly that has particular utility for mounting to the interior of an automobile, such as the sun visor thereof. Anyone who has driven in the glaring sun of summer, or faced the sun reflected off a snowy terrain, knows the value of a sun screen and the comfort it can provide the driver. Many automobiles, particularly later models, come with a windshield having a darkened area of perhaps four inches along the top of the windshield. However, this is often insufficient under the driving conditions noted above.

Supplementary sun screen devices, generally attachable to the pivotal sun visor normally provided above the windshield, are commercially available from automotive supply shops. One such commercial device is the Axius Auto-Shade, a trademark of Auto-Shade, L.L.C. of Moorpark, Calif. 93021. The device, commercially promoted as a visor glare reducer, comprises a darkened, translucent, plastic, rectangular shield having a spring biased clip for attaching to the lower or free edge of the sun visor of the automobile. The device is constructed to pivot about the clip such that the driver can flip the device to a position in close proximity to the windshield. Unfortunately, such a device offers only a single degree of protection to the driver, and would have to be flipped often to the changing glare and position of the sun.

In contrast, the assembly of the present invention offers plural degrees of sun protection to the driver, who in turn can easily and readily make the changes, as desired. The manner by which the assembly hereof meets these challenges will become apparent in the following description, particularly when read in conjunction with the accompanying drawings.

SUMMARY OF THE INVENTION

This invention relates to a telescopic sun screen assembly, comprising three major components, for mounting to the interior of an automobile, such as the sun visor thereof. A first said component comprises a bracket for slidably receiving the second component. The second component includes an opaque face, and is sized to slidably receive the third component. The latter component is characterized by a pair of different and distinct areas of translucency, such as light and dark, along a face thereof. In operation, the user can fully or partially extend the assembly to select the degree of sun protection desired.

To temporarily secure the assembly to a sun visor, for example, the bracket may be provided with at least one clip-on bracket, or spring clip to override an edge of the sun visor.

Accordingly, an object of this invention is to provide a convenient sun screen offering varying degrees of sun protection to a user thereof by extending or recessing the sun screen assembly hereof.

Another object of the present invention is the provision of a compact unit that may be readily attached within an automobile's interior.

These and other objects will become apparent to those skilled in the art from the following description, particularly when read in conjunction with the accompanying drawings.

BRIEF DESCRIPTION OF DRAWINGS

The invention is illustrated in the drawings in which like reference characters designate the same or similar parts throughout the figures of which:

FIG. 2 is a plan view of the interengaged components of FIG. 1, in an extended position.

FIG. 3 is a side view of the assembly of FIG. 2.

FIG. 4 is a plan view of the three components hereof, in a retracted position.

FIG. 5 is a side view of the assembly of FIG. 4.

FIG. 6 is a back plan, exploded view of a modified telescopic sun screen assembly of this invention, showing open backs for the upper two components.

FIG. 7 is a sectional view taken along line 7—7 of the upper component of FIG. 6.

FIG. 8 is a sectional view taken along line 8—8 of the middle component of FIG. 6.

FIG. 9 is a partial sectional view taken along line 9—9 of the upper component of FIG. 6.

FIG. 10 is a side view of the extended assembly hereof, further showing an exemplary hook or clip for mounting same to an automotive sun visor.

DETAILED DESCRIPTION OF THE PREFERRED EMBODIMENTS

Figure 1:
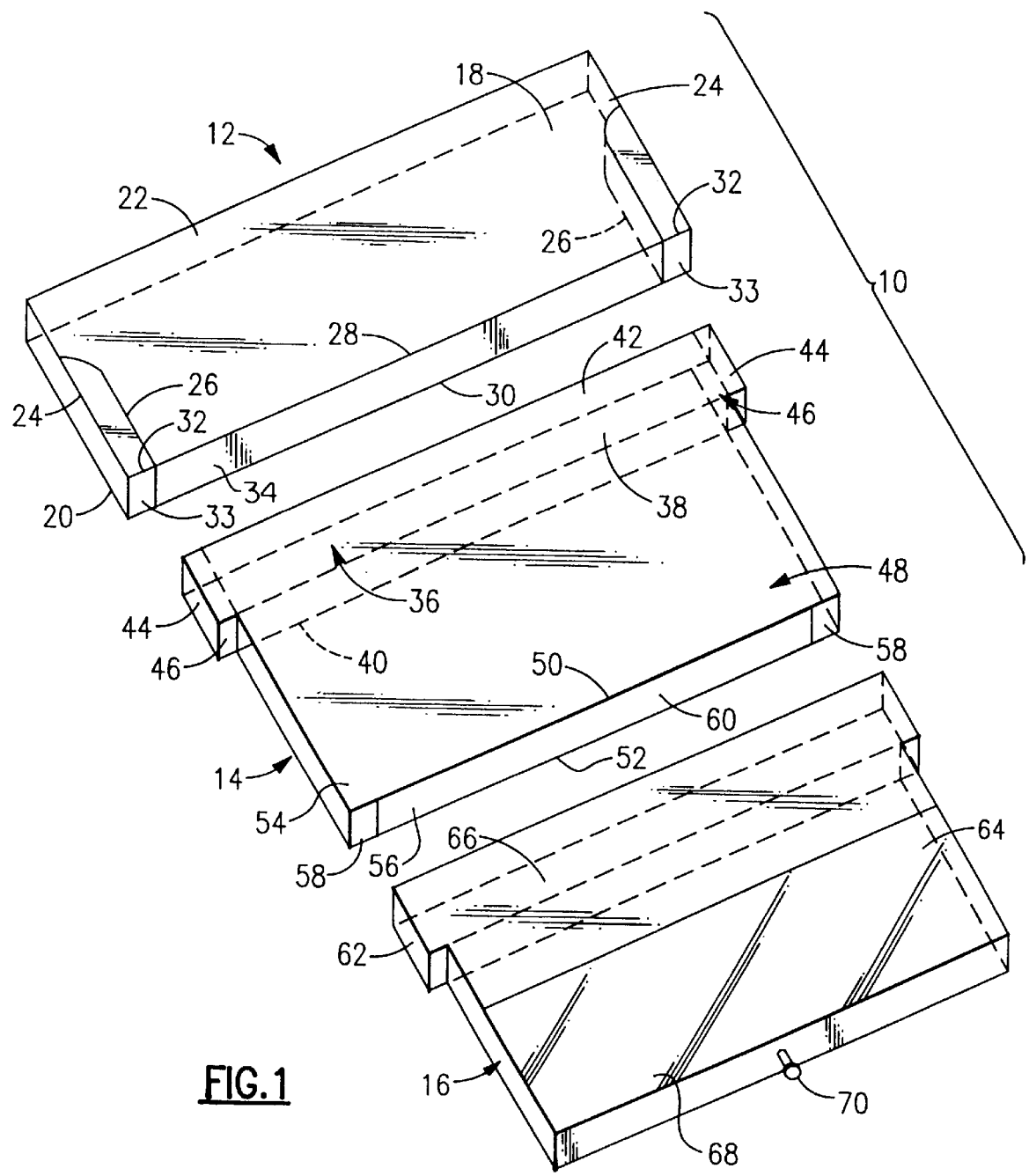
FIG. 1 is an exploded perspective view of a telescopic sun screen assembly according to this invention, showing the three major components thereof.

This invention relates to a sun screen protector assembly to provide options to the user thereof to select a preferred degree of protection from the glaring rays of the sun. The invention hereof will now be described with reference to the several Figures, where like reference numerals represent like components or features throughout the various views.

FIGS. 1 and 2 illustrate most clearly the three major components forming the sun screen assembly 10 of this invention. In this preferred embodiment, the upper component comprises a bracket 12 for mounting to a vehicle sun visor, for example. The remaining two components are a first sun screen protector 14 and a second sun screen protector 16, the latter preferably in the form of a planar panel.

The bracket 12 is essentially a rectangular housing having a top 18, a bottom 20, a removable back 22, and a pair of side walls 24, where each said side wall includes a pair of inwardly directed guides 26. Defined by the free edges 28, 30, respectively of the top 18 and bottom 20, and the ends 32 of the guide faces 33, is an open rectangular slot 34, of a first predetermined size.

For sliding receipt within the bracket 12 is the first sun screen protector 14. The first sun screen protector consists of a two part housing where a first housing part 36 is defined by a top 38, a bottom 40, a removable back wall 42, and a pair of short side walls 44. The first housing part is sized to slide within the bracket 12. To limit the sliding movement within the bracket, the first housing part 36 further includes a pair of inwardly directed wall sections 46. In the extended position, the respective wall sections 46 abut ends 33. Communicating with the first housing part 36 is the smaller, generally rectangular second housing part 48, where the lateral dimension is such as to pass through the slot 34. The free edges 50, 52, respectively of the top 54 and bottom 56, along with stops 58, define a slot 60 of a second predetermined size. Since a purpose hereof is to provide plural degrees of shielding from the sun, the top 54 is formed with an opaque film, for example.

The third component, or second sun screen protector 16, preferably comprises a T-configured, planar panel, having an upper arm 62 of a size to slide within the second housing part 48, and a lower arm 64 having a lateral dimension to pass through the slot 60. A further feature of the second sun screen protector 16 is the provision of two sun screen areas 66, 68, where the upper area 66 reveals a first translucency, and the lower area 68 reveals a second and distinctly different translucency, preferably lighter. Thus, two further options for sun glare protection are available to the user thereof. To facilitate movement, i.e., extending or retracting, an extended tab 70 may be provided.

To position the sun screen protector assembly in an operable condition, the second sun screen protector 16 is pushed into the first sun screen protector 14 via the removable back wall 42, whereupon these two components are inserted into the bracket 12, through the removable back 22. Except for the limited extension of the assembly, as described above, the respective components are slidably arranged, one to the others.

FIGS. 6 through 9 illustrate a second embodiment for the sun screen protector assembly 72 of this invention. Briefly, where rear or underside plan views of the three major components are shown in FIG. 6, and which are preferably made of plastic or other resilient material to allow flexing and relative movement therebetween, the mounting bracket 74 comprises a generally rectangular member having a planar face 76 and a pair of inwardly directed rear walls 78. The side walls 80 are characterized by a pair of opposed cam following inner surfaces 82 where the distance therebetween is a first predetermined length, "X". A first end of the cam surface 82 features a recess 84, with the distal end thereof including a cam stop 86, where the lateral distance therebetween is of a second predetermined length<"X".

The second component or first sun screen protector 88, is similarly constructed to the mounting bracket 74. The sun screen protector 88 includes a planar face 90, having an opaque layer or film thereon, and a pair of inwardly directed rear walls 92. Further included are a pair of side walls 94, featuring an inner cam following surface 95 with a pair of cam receiving recesses 96. The lateral distance between the outer edges 98 of the side walls 94 is slightly less than said predetermined length "X" so as to slidably move within the mounting bracket 74. Also, the outer edges 98 include camming bumps 100 to initially reside in the recesses 84, until the components are extended by the user thereof, whereupon the camming bumps 100 ride along the cam following surfaces 82 until reaching the intermediate cam stops 86. The distance between the inner cam following surfaces 94 is of a predetermined length "Y".

The third major component, or planar sun screen panel 102, is generally rectangular in configuration, with a pair of camming bumps 104 at the ends of the outer edges 106. The distance between the respective outer edges 106 is slightly less than the predetermined length "Y" so as to slidably move along the cam following surfaces 94. The panel 102, like the first embodiment of FIGS. 1 through 5, features two distinctly different translucency areas 108, 110, where the upper area 110 is preferably darker. Thus, as the said second and third components are moved relative to one another, the sun screen panel 102, with the camming bumps 106 riding along the inner cam following surfaces 94, first reaches the intermediate recesses to expose the said lower area 108. With additional user effort, the sun screen panel 102 may be further moved relative to sun screen protector 88 to expose the said upper area 110. By this arrangement, the user thereof can easily and quickly select the sun glare protection desired.

Finally, as illustrated in FIG. 10, where a single exemplary suspending clip 112 is shown, such clip or clips, or a spring biased clip, as known in the art, may be secured to the bracket 12, 74 for temporarily mounting the sun screen protector assembly to the automobile sun visor, for example.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. A telescopic sun screen assembly for mounting to the interior of an automobile, where the sun screen assembly offers the user varying degrees of sun protection from low translucency to opacity, said sun screen assembly comprising:

a) a housing bracket for mounting to the interior of an automobile, wherein said housing bracket includes an elongated channel for slidably receiving a first panel member;

b) said first panel member having an elongated channel for slidably receiving a second panel member, where said first panel member includes an opaque face; and, c) said second panel member having a face which lies in close proximity to said opaque face in a non-telescoped position, where the face of said second panel member has two distinct and different areas of translucency, whereby the user thereof can conveniently select the degree of sun protection.

2. The telescopic sun screen assembly according to claim 1, wherein said two distinct and different areas of translucency are horizontally disposed, with the lower most said area lighter and the upper most said area darker.

3. The telescopic sun screen assembly according to claim 1, wherein said housing bracket includes a restricted opening through which said first panel is slidably movable over a limited range.

4. The telescopic sun screen assembly according to claim 3, wherein said first panel includes a restricted opening through which said second panel is slidably movable over a limited range.

5. The telescopic sunscreen assembly according to claim 4, wherein said second panel includes a pair of external sliding surfaces, and said first panel includes a pair of complementary internal sliding surfaces, where the respective said sliding surfaces include camming means to selectively position said second panel, relative to said first panel, in first and second positions.

6. The telescopic sun screen assembly according to claim 1, wherein said housing bracket includes means for fastening and positioning said bracket within the interior of an automobile.

7. The telescopic sun screen assembly according to claim 1, further including handle means for slidably moving said housing bracket and said panel members relative to one another.

* * * * *